United States Patent
Hsieh et al.

(10) Patent No.: US 9,984,292 B2
(45) Date of Patent: May 29, 2018

(54) SPEAKER DEVICE AND SPEAKER CONTROL METHOD

(71) Applicant: XIX INC., New Taipei (TW)

(72) Inventors: Jung-Ya Hsieh, Hsinchu (TW); Yao-Tsung Yeh, New Taipei (TW); Chun-Yen Yu, New Taipei (TW); Shu-Ming Wei, New Taipei (TW)

(73) Assignee: XIX INC., New Taipei (TW)

( * ) Notice: Subject to any disclaimer, the term of this patent is extended or adjusted under 35 U.S.C. 154(b) by 0 days. days.

(21) Appl. No.: 15/372,398

(22) Filed: Dec. 8, 2016

(65) Prior Publication Data

US 2017/0171686 A1   Jun. 15, 2017

Related U.S. Application Data

(60) Provisional application No. 62/266,005, filed on Dec. 11, 2015.

(51) Int. Cl.
| | |
|---|---|
| *H04R 5/02* | (2006.01) |
| *G06K 9/00* | (2006.01) |
| *G06K 9/66* | (2006.01) |
| *H04R 1/02* | (2006.01) |
| *H04R 3/00* | (2006.01) |
| *H04R 3/12* | (2006.01) |
| *H04R 5/04* | (2006.01) |

(Continued)

(52) U.S. Cl.
CPC ..... *G06K 9/00718* (2013.01); *G06K 9/00335* (2013.01); *G06K 9/00744* (2013.01); *G06K 9/00758* (2013.01); *G06K 9/00771* (2013.01); *G06K 9/66* (2013.01); *H04R 1/028* (2013.01); *H04R 3/00* (2013.01); *H04R 3/12* (2013.01); *H04R 5/02* (2013.01); *H04R 5/04* (2013.01); *H04R 29/001* (2013.01); *H04S 7/308* (2013.01); *G06K 2009/00738* (2013.01); *H04R 2420/01* (2013.01); *H04R 2420/05* (2013.01)

(58) Field of Classification Search
CPC ........... G06K 9/66; G06K 2009/00738; G06K 9/00335; G06K 9/00718; G06K 9/00744; G06K 9/00758; G06K 9/00771; H04R 1/028; H04R 2420/01; H04R 2420/05; H04R 29/001; H04R 3/00; H04R 3/12; H04R 5/02; H04R 5/04; H04S 7/308
USPC ..... 381/58, 59, 61, 103, 111, 182, 300, 306, 381/333; 700/94
See application file for complete search history.

(56) References Cited

U.S. PATENT DOCUMENTS

| | | | |
|---|---|---|---|
| 9,647,619 B2 * | 5/2017 | Debard ................ | H03G 3/00 |
| 2003/0035555 A1 * | 2/2003 | King .................... | H03G 5/005 |
| | | | 381/103 |

(Continued)

*Primary Examiner* — Vivian Chin
*Assistant Examiner* — Friedrich W Fahnert
(74) *Attorney, Agent, or Firm* — ScienBiziP, P.C.

(57) ABSTRACT

A speaker device with a processing unit and a storage device for controlling the operation of the speaker device also has a speaker unit and a connection module. The processing unit adjusts the speaker unit to operate in a first sound mode based on the first frequency characteristic of the speaker unit, and detects whether the connection module is communicatively coupled with a sound device having a second frequency characteristic. The processing unit switches the speaker unit from the first sound mode into a second sound mode based on the comparison between the first frequency characteristic and the second frequency characteristic.

12 Claims, 6 Drawing Sheets

(51) Int. Cl.
*H04R 29/00* (2006.01)
*H04S 7/00* (2006.01)

(56) References Cited

U.S. PATENT DOCUMENTS

| | | | | |
|---|---|---|---|---|
| 2003/0185400 | A1* | 10/2003 | Yoshizawa | H04R 5/02 381/58 |
| 2006/0149402 | A1* | 7/2006 | Chung | H04S 7/307 700/94 |
| 2009/0273387 | A1* | 11/2009 | Howard | H03F 3/187 327/407 |
| 2009/0274312 | A1* | 11/2009 | Howard | H04R 29/003 381/58 |

\* cited by examiner

SPEAKER DEVICE AND SPEAKER CONTROL METHOD

CROSS-REFERENCE TO RELATED APPLICATIONS

This application claims priority to Provisional Patent Application No. 62/266,005 filed on Dec. 11, 2015, the contents of which are incorporated by reference herein.

FIELD

The subject matter herein generally relates to control method of a speaker device.

BACKGROUND

Commercial speakers do not have the option to change their output mode, for example, the option to change output frequency or output sound channel when a new speaker is connected to them. Thus, both the new speaker and the existing speaker provide their respective output based on their original frequency range without adjusting to optimize overall system performance.

BRIEF DESCRIPTION OF THE DRAWINGS

Implementations of the present disclosure will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts can be exaggerated to better illustrate details and features. The description is not to be considered as limiting the scope of the exemplary embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

Figure 1:
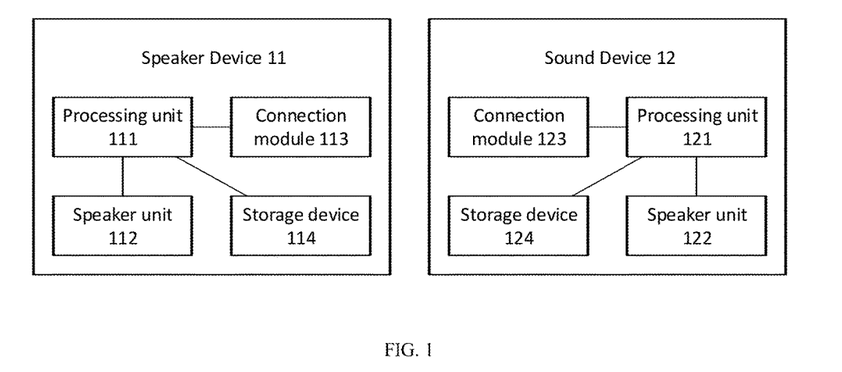
FIG. 1 is a block diagram of one exemplary embodiment of a speaker device coupled to a sound device.

FIG. 1 illustrates an exemplary embodiment of a speaker device 11 coupled to a sound device 12. In the exemplary embodiment, the speaker device 11 can include a processing unit 111, a speaker unit 112, a connection module 113, and a storage device 114. The speaker unit 112, the connection module 113, and the storage device 114 are coupled to the processing unit 111 by a system bus. FIG. 1 illustrates only one example of the speaker device 11, the speaker device 11 in other exemplary embodiments can include more or fewer components than as illustrated, or have a different configuration of the various components.

In at least one exemplary embodiment, the processing unit 111 can be a processor, a central processing unit (CPU), a graphic processing unit (GPU), a system on chip (SoC), a field-programmable gate array (FPGA), or a controller for executing the program instruction in the storage device 114. The processing unit 111 can further include an embedded system or an application specific integrated circuit (ASIC) having embedded program instructions.

In at least one exemplary embodiment, the speaker unit 112 can be a full-range speaker, a subwoofer, a woofer, a mid-ranger speaker, a tweeter, or a speaker having a specific frequency characteristic. In one exemplary embodiment, the speaker unit 112 can be a full-range speaker having a first frequency characteristic. The first frequency characteristic is a full-range of the audible frequency. Thus, the speaker unit 112, having a first frequency characteristic, is configured for reproducing as much of the audible frequency range as possible.

In at least one exemplary embodiment, the connection module 113 can adopt customizable protocols or follow existing standards or de facto standards such as BLUETOOTH, ETHERNET, IEEE 802.11 and IEEE 802.15 series, Wireless USB, infrared communication or telecommunication standards such as GSM, CDMA2000, TD-SCDMA, WiMAX, 3GPP-LTE, and TD-LTE.

In at least one exemplary embodiment, the storage device 114 can be a non-volatile computer readable storage medium that can be electrically erased and reprogrammed, such as read-only memory (ROM), random-access memory (RAM), erasable programmable ROM (EPROM), electrically EPROM (EEPROM), hard disk, solid state drive, or other forms of electronic, electromagnetic, or optical recording medium. In at least one exemplary embodiment, the storage device 114 can include interfaces that can enable access to the aforementioned computer readable storage medium, to enable the speaker device 11 to connect to and access such computer readable storage medium. In another exemplary embodiment, the storage device 114 can include network accessing device to enable the speaker device 11 to connect and access data stored in a remote server or a network-attached storage.

In the exemplary embodiment, the sound device 12 can include a processing unit 121, a speaker unit 122, a connection module 123, and a storage device 124. The speaker unit 122, the connection module 123, and the storage device 124 are coupled to the processing unit 121 by a system bus. FIG. 1 illustrates only one example of the sound device 12. The sound device 12 in other exemplary embodiments can include more or fewer components than as illustrated, or have a different configuration of the various components.

In at least one exemplary embodiment, the processing unit 121 can be a processor, a central processing unit (CPU), a graphic processing unit (GPU), a system on chip (SoC), a field-programmable gate array (FPGA), or a controller for executing the program instruction in the storage device 124. The processing unit 121 can further include an embedded system or an application specific integrated circuit (ASIC) having embedded program instructions.

In at least one exemplary embodiment, the speaker unit 122 can be a full-range speaker, a subwoofer, a woofer, a mid-range speaker, a tweeter, or a speaker having a specific frequency characteristic. In one exemplary embodiment, the speaker unit 122 can be a subwoofer having a second frequency characteristic. The second frequency characteristic is a range of low-pitched audio frequencies, such as 20-200 Hz. Thus, the speaker unit 122 is dedicated to the reproduction of low-pitched audio frequencies.

In at least one exemplary embodiment, the connection module 123 can adopt customizable protocols or follow existing standards or de facto standards such as BLUETOOTH, ETHERNET, IEEE 802.11 and IEEE 802.15 series, Wireless USB, infrared communication or telecommunication standards such as GSM, CDMA2000, TD-SCDMA, WiMAX, 3GPP-LTE, and TD-LTE.

In at least one exemplary embodiment, the storage device 124 can be a non-volatile computer readable storage medium that can be electrically erased and reprogrammed, such as read-only memory (ROM), random-access memory (RAM), erasable programmable ROM (EPROM), electrically EPROM (EEPROM), hard disk, solid state drive, or other forms of electronic, electromagnetic, or optical recording medium. In at least one exemplary embodiment, the storage device 124 can include interfaces that can enable access to the aforementioned computer readable storage medium to enable the sound device 12 to connect to and access such computer readable storage medium. In another exemplary embodiment, the storage device 124 can include network accessing device to enable the sound device 12 to connect and access data stored in a remote server or a network-attached storage.

Figure 2:
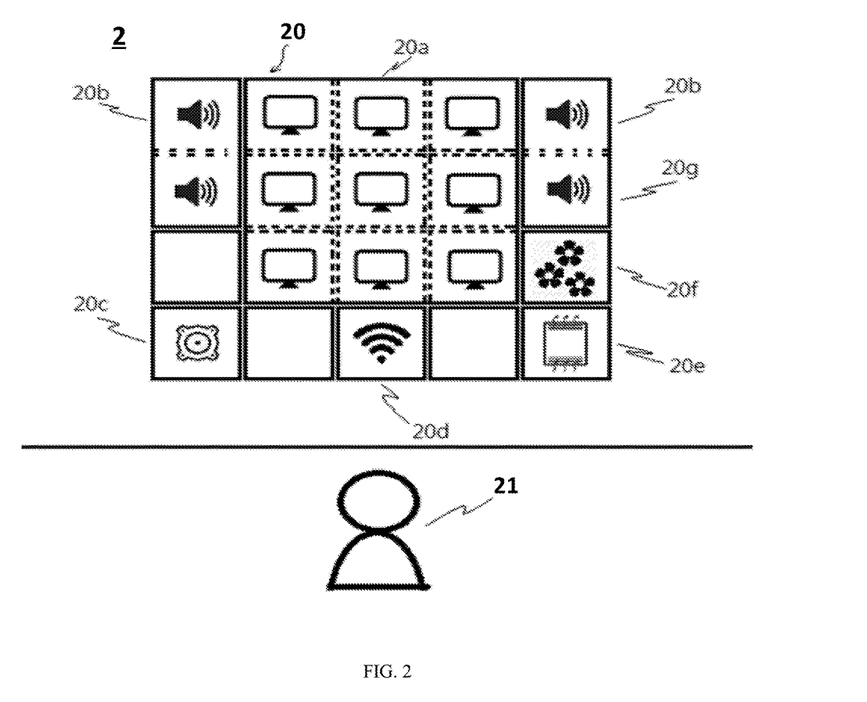
FIG. 2 is a schematic illustration of one exemplary embodiment of a speaker device mounted on a surface mounted multifunctional intelligent modular system.

FIG. 2 is a schematic illustration of one exemplary embodiment of a speaker device 20b mounted on a surface mounted multifunctional intelligent modular system 20. FIG. 2 shows a surface mounted multifunctional intelligent modular system mounted on a mounting surface (e.g., a wall 2) in a manner that is observable and operable by a user 21. The surface mounted multifunctional intelligent modular system includes an exemplary speaker device 11 (e.g., a speaker device 20b) and an exemplary sound device 12 (e.g., a sound device 20c) in FIG. 1.

In at least one exemplary embodiment, the modular system 20 comprises a plurality of rectangular functional module units (e.g., different functional module units 20a-g) mounted to the supporting surface (e.g., wall 2) through one or more discrete mounting member (not shown). Each of the exemplary functional module units 20a-g is configured to assume a flat and substantially rectangular structural profile that resembles a wall tile. The flat and geometrically regular structural configuration of the functional module units allows them to be arranged in close proximity to each other in an organized manner, so as to effectively cover a wide span of the wall 2. The flat construction of the functional module units 20a-g also facilitates efficient space usage upon installation to the wall 2, as the thin profile of the module units are made to reduce necessary space requirement.

In at least one exemplary embodiment, the display module unit 20a may comprise a flat panel display device of either volatile or static type. The flat panel display device may include at least one of a liquid crystal display (LCD) type device, plasma panel type device, electroluminescent display (ELD) type device, light emitting diode (LED) type device, organic light-emitting diode (OLED) type device, and other suitable type of thin profiled display devices. As shown in FIG. 2, the exemplary display module unit 20a has a viewing surface that substantially occupies nine "modular unit blocks." In at least one exemplary embodiment, the display module unit 20a may be a single integral display unit having a viewing area that spans nine modular unit blocks. The inter-device communication and synchronization between individual smaller sized display units may be established through suitable wired configuration (such as wires and cables) or through proper wireless setup (such as through Bluetooth or other wireless configurations). Moreover, the inter-device coordination/cooperation may be processed directly by the display devices, or may be done indirectly through connections to a central control unit (e.g., the control module unit 20d).

In at least one exemplary embodiment, the speaker device 20b may comprise audio driving components configured for reproducing audio for a set of first audio frequency. The speaker device 20b provides a flexible and economical piece of acoustic equipment with a satisfactory compromise between device cost and performance. The speaker device 20b may be configured to maintain a substantially flat rectangular profile that conforms to the overall aesthetic format of the surface mounted multifunctional intelligent modular system 20. In some exemplary embodiments, the speaker device 20b may be configured to assume a thicker profile, so as to provide a sufficient internal volume to accommodate the associated loudspeaker components. The speaker device 20b may be provided with inter-device communication capabilities, and may be configured to adjust its own mode of operation (e.g. the full range speaker adjusted to select its own frequency range or its own channel) to cooperate with other multimedia modular devices (e.g., to function cooperatively with the sound device 20c or other speaker devices 20b) to generate an immersive multi-dimensional acoustic environment. The inter-device communication and synchronization between two or more speaker devices and sound devices may be established through suitable wired configuration (such as wires and cables) or through proper wireless setup (such as meshed Bluetooth network or other wireless configurations). Moreover, the inter-device coordination/cooperation may be processed directly onboard the speaker device(s), or may be done indirectly through connections to a central control unit (e.g., the control module unit 20d).

In at least one exemplary embodiment, the sound device 20c may comprise audio driving components dedicated to the reproduction of a set of second audio frequencies. The sound device 20c is provided to augment/replace a part of the frequency range of the speaker device 20b. The sound device 20c may be configured to maintain a substantially flat rectangular profile that conforms to the overall aesthetic format of the surface mounted multifunctional intelligent modular system 20. However, in some exemplary embodiments, the sound device 20c may be configured to assume a thicker profile, so as to provide a sufficient internal volume to accommodate the associated frequency boosting components. In addition, the sound device 20c may also be provided with inter-device communication capabilities. The inter-device communication and synchronization between two or more audio module units may be established through suitable wired configuration (such as wires and cables) or through proper wireless setup (such as through Bluetooth or other wireless configurations). Moreover, the inter-device coordination/cooperation may be processed directly onboard the speaker module unit(s), or may be done indirectly through connections to a central control unit (e.g., the control module unit 20d).

In at least one exemplary embodiment, the inter-device communication and synchronization between two or more speaker device (e.g., the speaker device 20b and the sound device 20c) can be established using Bluetooth network or other network, which employs a communication protocol with master-slave structure. The master device (e.g., speaker device 20b) communicates with one or more slave devices (such as the sound device 20c) linked or paired in a wireless group. The roles of the master and slave devices may be configured or interchanged, for example, by the control module unit 20d or the processor in each of the module units, based on the operational requirement or structural setting.

In at least one exemplary embodiment, the control module unit 20d functions as a main operational core for the surface mounted multifunctional intelligent modular system 20 and controls and/or monitors the operations of the functional module units (e.g., the display module unit 20a, the pair of speaker device 20b, and sound device 20c are arranged at the lower left corner). The control module unit 20d further is configured to communicate with a remote cloud computing server (not shown) for retrieving operational data of the modular system 20 and transmitting the user operation data to the remote cloud computing server for future control operations. The operational data of modular system 20 may include application execution data, user behavior data related to the user 21, audio related data for speaker device 20b and sound device 20c, light setting controlled related data, and display content for the display module unit 20a.

In at least one exemplary embodiment, the modular system 20 comprises other rectangular functional module units 20e-g for specific operational needs, such as an air purifying module unit and an aromatherapy module unit.

Figure 3:
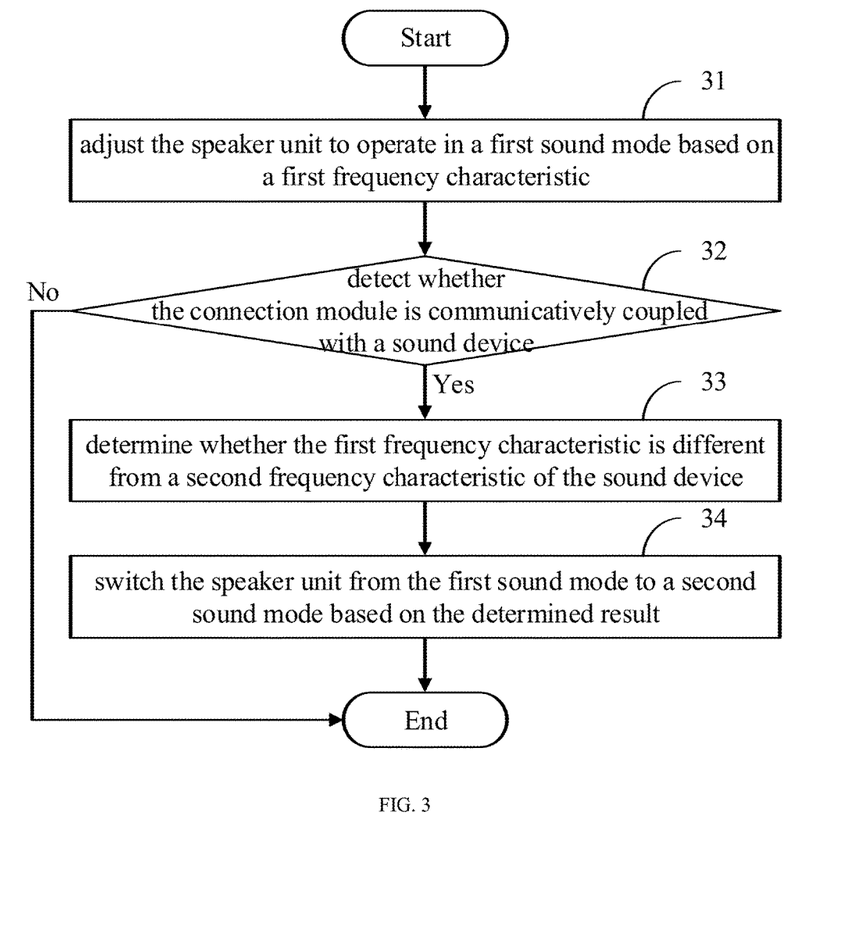
FIG. 3 is a flowchart of one exemplary embodiment of a control method for the speaker device of FIG. 1.

FIG. 3 illustrates a flowchart of an exemplary method. The exemplary method described below can be carried out using the configuration illustrated in FIG. 1, for example, and various elements of these figures are referenced in explaining the exemplary method. Each block shown in FIG. 3 represents one or more processes, methods, or subroutines, carried out in the exemplary method. Furthermore, the order of blocks is provided only to illustrate the exemplary method and may be modified. Additional blocks can be added or fewer blocks can be utilized without departing from this disclosure. The exemplary method can begin at block 31.

At block 31, the speaker device 11 adjusts the speaker unit 112 to operate in a first sound mode based on a first frequency characteristic.

Figure 4A:
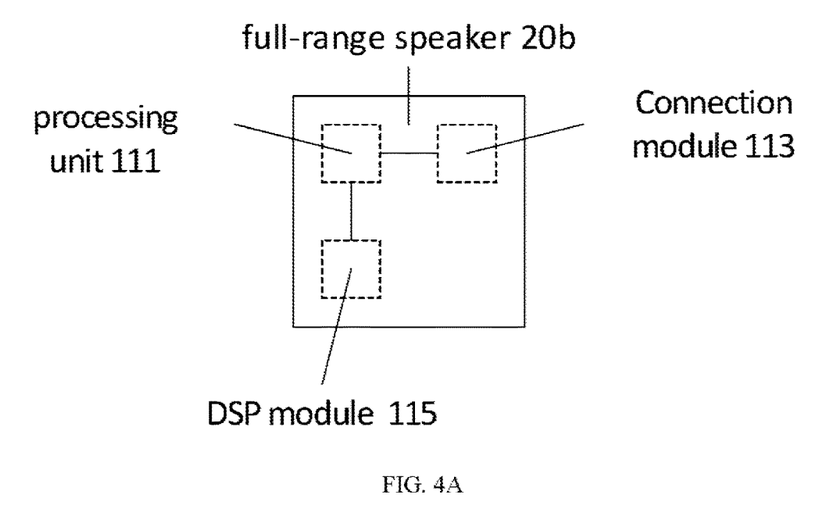
FIG. 4A is a schematic illustration of a speaker device in accordance with some exemplary embodiments of the present disclosure.

In at least one exemplary embodiment, the speaker unit 112 can be configured to reproduce as much of the audible frequency range as possible in the first sound mode when the first frequency characteristic is a full-range of audible frequency. FIG. 4A is a schematic illustration of a speaker device 11 (e.g., the full-range speaker 20b) in accordance with some exemplary embodiments of the present disclosure. The exemplary full-range speaker 20b comprises audio driving components configured for reproducing as much of the audible frequency range as possible.

Figure 5A:
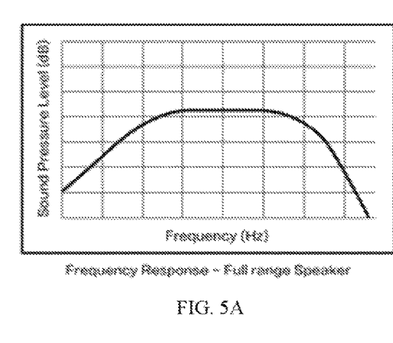
FIG. 5A shows an output frequency response plot of an exemplary full-range speaker operating individually.

In at least one exemplary embodiment, the full-range speaker 20b comprises a processing unit 111, a connection module 113 communicatively coupled to the processing unit 111, and a digital signal processing (DSP) unit 115 communicatively coupled to the processing unit 111. The processing unit 111 may encompass necessary hardware and associated software components that enable data processing capabilities for the full-range speaker 20b. The DSP unit 115 may be a microprocessor configured to perform digital signal processing, such as audio signal processing. The connection module 113 may comprise necessary hardware and associated software components that provide the full-range speaker 20b with the inter-device communication capabilities. In at least one exemplary embodiment, the processing unit 111 of the full-range speaker 20b is configured for adjusting the speaker unit's mode of operation to cooperate with other multimedia modular devices. FIG. 5A shows an output frequency response plot of an exemplary full-range speaker 20b when the full-range speaker 20b is operating individually before being integrated into a unitary system (e.g., modular system 20). When operating individually without other speaker device, the full-range speaker 20b is configured to divert its output capabilities toward the lower frequency range. Under this operation mode, the full-range speaker 20b sacrifices its peak output capabilities in the high frequency region in order in exchange for a wider and well-rounded output range.

At block 32, speaker device 11 is detected whether the speaker device 11 is communicatively coupled with a sound device 12 having a second frequency characteristic. If the speaker device 11 is communicatively coupled with the sound device 12, the procedure goes to block 33. If the speaker device 11 is not communicatively coupled with the sound device 12, the procedure ends.

In at least one exemplary embodiment, when the processing unit 111 of the speaker device 11 detects the sound device 12 connected to the connection module 113, the processing unit 111 instructs the connection module 113 to perform a linking/pairing operation with the connection module 123 of the sound device 12. In at least one exemplary embodiment, the connection module 113 of the speaker device 11 establishes a communication link with the connection module 123 of the sound device 12 through suitable wired configuration (such as wires and cables) or through proper wireless setup (such as through Bluetooth or other wireless configurations). Once the communication link is established, the connection module 113 and the connection module 123 are enabled, and a master-slave connection between the speaker device 11 and the sound device 12 is established.

Figure 4B:
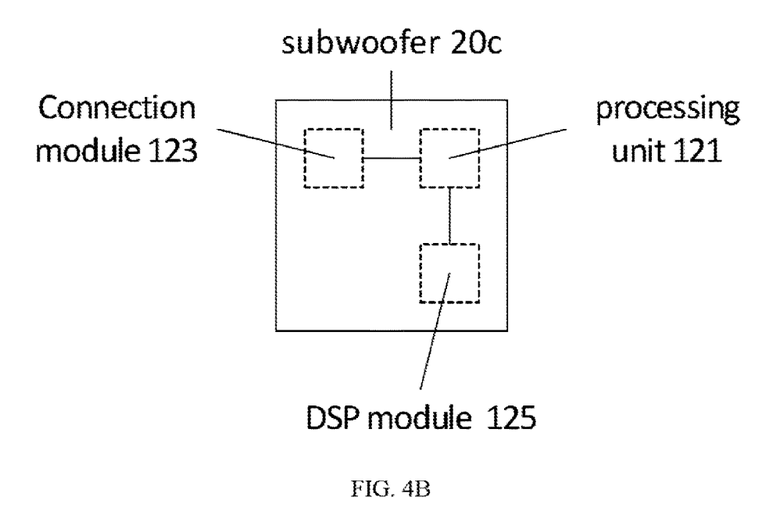
FIG. 4B is a schematic illustration of a sound device in accordance with some exemplary embodiments of the present disclosure.

In at least one exemplary embodiment, the sound device 12 can be dedicated to the reproduction of low-pitched audio frequencies when the second frequency characteristic is the subwoofer characteristic. FIG. 4B is a schematic illustration of a sound device 11 (e.g., the subwoofer 20c) in accordance with some exemplary embodiments of the present disclosure. The exemplary subwoofer 20c comprises audio driving components dedicated to the reproduction of low-pitched audio frequencies.

Figure 5B:
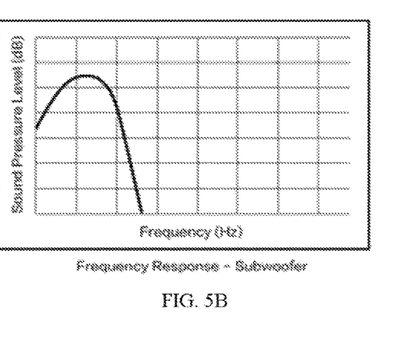
FIG. 5B shows an output frequency response plot of an exemplary subwoofer when the operating individually.

In at least one exemplary embodiment, the subwoofer 20c comprises a processing unit 121, a connection module 123 communicatively coupled to the processing unit 121, and a digital signal processing (DSP) unit 125 communicatively coupled to the processing unit 121. The processing unit 121 may encompass necessary hardware and associated software components that enable data processing capabilities for the subwoofer 20c. The DSP unit 125 may be a microprocessor configured to perform digital signal processing, such as audio signal processing. The connection module 123 may comprise necessary hardware and associated software components that provide the subwoofer 20c with the inter-device communication capabilities. The inter-device cooperation of multiple sound generating modules may facilitate the formation of an immersive multi-dimensional acoustic environment. FIG. 5B shows an output frequency response plot of an exemplary subwoofer 20c when the subwoofer 20c is operating individually before being integrated into a unitary system (e.g., modular system 20).

In at least one exemplary embodiment, the inter-device communication and synchronization between the speaker device 11 and the sound device 12 or more speaker devices may be established through suitable wired configuration (such as wires and cables) or through proper wireless setup (such as through Bluetooth or other wireless configurations). Moreover, the inter-device coordination/cooperation may be processed directly onboard the speaker device 11 (e.g., the full-range speaker 20b), or may be done indirectly through connections to the control module unit 20d. In at least one exemplary embodiment, the connection module 113 establishes inter-device communication and synchronization between the subwoofer 20c or more speaker device using network technology, which can employ a communication protocol with master-slave structure. The master device (e.g., full-range speaker 20b) communicates with the subwoofer 20c, where it is linked or paired to in the same wireless communication group. The roles of the master and slave devices may be configured or interchanged, for example, by the control module unit 20d or one of the processing unit 113 and the processing 123 based on the operational requirement or structural setting.

In at least one exemplary embodiment under the system architecture of FIG. 2, where the speaker device 20b and the sound device 20c are controlled by the control module unit 20d, the control module unit 20d operatively configures the master-slave relationship between the speaker device 20b and the sound device 20c when the control module unit 20d detects the presence of both the speaker device 20b and the sound device 20c. The control module unit 20d may, for instance, configures the speaker device 20b to be master device and the sound device 20c to be the slave device, and establishes a communication link between the speaker device 20b and the sound device 20c. The speaker device 20b functions as the master device, the processing unit 111 retrieves audio data from the control module unit 20d or a remote cloud computing server for the DSP unit 115 to process, and transmits the audio data to the sound device 20c through connection module 113. At the same time, the DSP unit 125 configures its own output audio response (sensitivity response) based on the second frequency characteristic of the sound device 20c. For another instance, the control module unit 20d may configure the speaker device 20b to be slave device and the sound device 20c as the master device. The processing unit 121 retrieves audio data from the control module unit 20d or the remote cloud computing server for the DSP unit 125 to process, and transmits the audio data to the speaker device 11 through connection module 123.

Figure 4C:
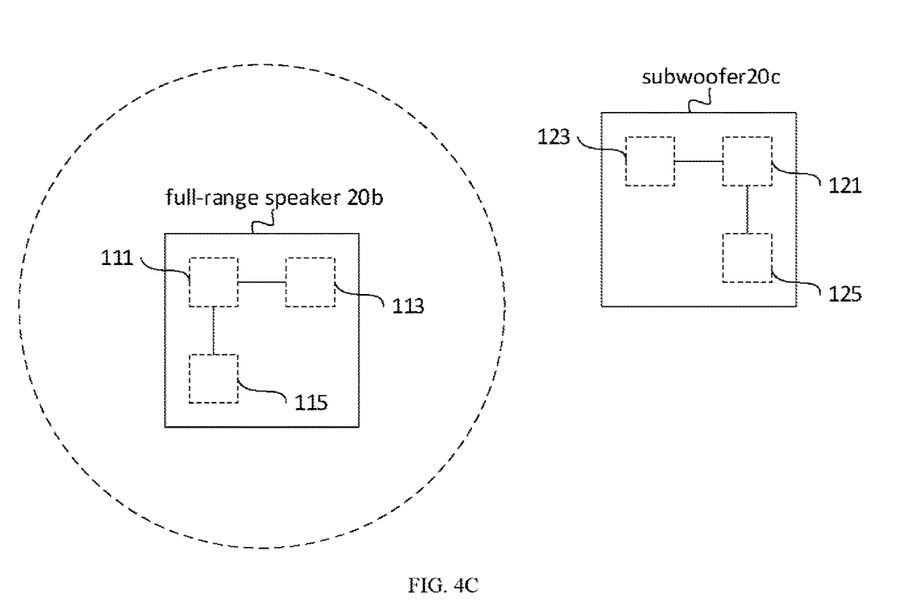
FIG. 4C is a schematic illustration of a speaker device and a sound device in accordance with some exemplary embodiments of the present disclosure.
Figure 4D:
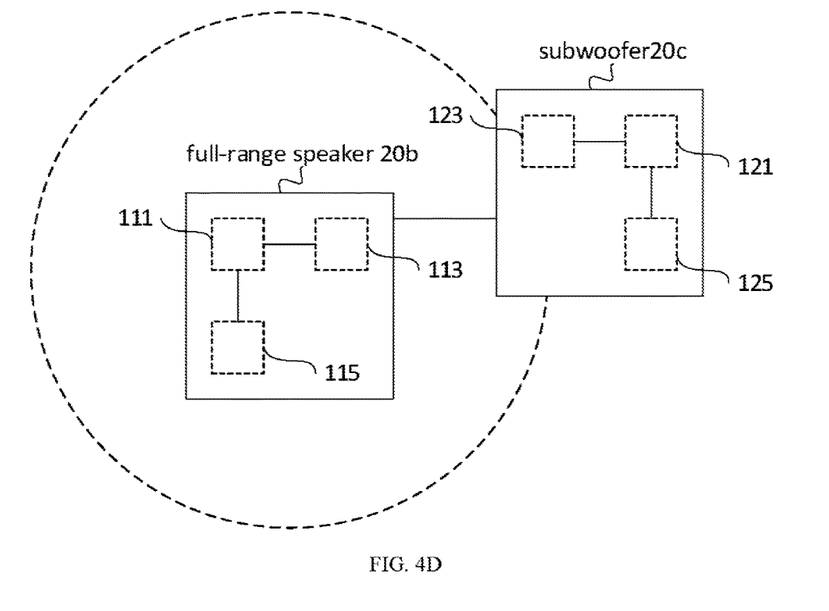
FIG. 4D is a schematic illustration of functional module expansion of a surface mounted multifunctional intelligent modular system in accordance with some exemplary embodiments of the present disclosure.

FIG. 4C is a schematic illustration of functional module expansion of a surface mounted multifunctional intelligent modular system in accordance with some exemplary embodiments of the present disclosure. Specifically, FIG. 4C shows a full-range speaker 20b already installed in a multifunctional intelligent modular system 20 in accordance with the present disclosure. A subwoofer 20c is placed outside a connectivity sphere (indicated by the dotted circle) of the exemplary modular system. That is, the subwoofer 20c has not yet been incorporated in to the exemplary modular system 20. FIG. 4D is a schematic illustration of functional module expansion of a surface mounted multifunctional intelligent modular system in accordance with some exemplary embodiments of the present disclosure. Specifically, FIG. 4D shows the addition of a subwoofer 20c into the exemplary multifunctional intelligent modular system 20. The inter-device communication and synchronization between the newly added and the existing modular may be established in a wired and/or a wireless manner as previously discussed. Thus, the processing unit 111 or the control module unit 20d can determine the speaker device 11 is communicatively coupled with the sound device 12.

At block 33, one of the processing unit 111 and the control module unit 20d compares the first frequency characteristic with the second frequency characteristic to determine whether the first frequency characteristic is different from the second frequency characteristic.

In at least one exemplary embodiment, the first frequency characteristic of the speaker device 11 is determined based on a first frequency response of the speaker device 11, and the second frequency characteristic of the sound device 12 is determined based on a second frequency response of the sound device 12. In at least one exemplary embodiment, the first frequency response of the speaker device 11 is identical to the second frequency response of the sound device 12. Thus, the processing unit 111 or the control module unit 20d can determine that the first frequency characteristic is the same as the second frequency characteristic.

In at least one exemplary embodiment, the first frequency response of the speaker device 11 is different from the second frequency response of the sound device 12. The processing unit 111 or the control module unit 20d can determine the first frequency characteristic based on the first frequency response of the speaker device 11 and determine the second frequency characteristic based on the second frequency response of the sound device 12. When the first frequency response almost covers the entire audio frequency range, the first frequency response may belong to a full-range region and the first frequency characteristic is a full-range of audible frequency. When the first frequency response only covers low-pitched audio frequencies, such as frequencies below 200 Hz, the first frequency response may belong to a subwoofer region and the first frequency characteristic is the subwoofer characteristic. Thus, the processing unit 111 or the control module unit 20d can compare the first frequency characteristic with the second frequency characteristic based on a first region to which the first frequency response belongs and a second region to which the second frequency response belongs. For example, both of the first frequency response and the second frequency response almost cover the entire audio frequency range. Thus, both of the first frequency response of the speaker device 11 and the second frequency response of the sound device 12 belong to a full-range region so both of the first frequency characteristic and the second frequency characteristic can be determined as a full-range of audible frequency. The processing unit 111 or the control module unit 20d can determine that the first frequency characteristic is the same as the second frequency characteristic, although the first frequency response may be different from the second frequency response.

At block 34, one of the processing unit 111 and the control module unit 20d switches the speaker unit 112 from the first sound mode to a second sound mode based on the determined result.

Figure 5C:
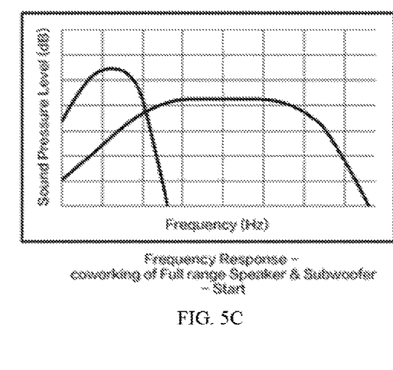
FIG. 5C shows output frequency response plots of a full-range speaker and a subwoofer before inter-module integration.
Figure 5D:
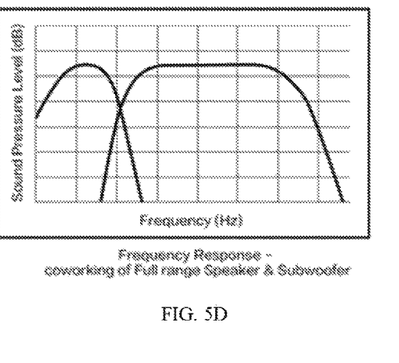
FIG. 5D shows output frequency response plots of a full-range speaker and a subwoofer after the establishment of cooperative inter-device connection.

In at least one exemplary embodiment, the processing unit 111 or the control module unit 20d can provide a first sound channel signal to the speaker unit 112 and control the speaker unit 112 to provide a signal output of the first sound channel signal within a first frequency range in the first sound mode. When the first frequency characteristic is determined to be different from the second frequency characteristic, the processing unit 111 or the control module unit 20d can provide the first sound channel signal to the speaker unit 112, and switch the speaker unit 112 from the first sound mode to the second sound mode to provide the signal output of the first sound channel signal within a second frequency range in the second sound mode. At the same time, the processing unit 111 or the control module unit 20d can control the sound device 12 to provide the signal output within a third frequency range in the second sound mode. In the exemplary embodiment, the first frequency range, the second frequency range, and the third frequency range are different from each other. Reference is concurrently made to FIGS. 5C-D. FIG. 5C shows output frequency response plots of a full-range speaker 20b and a subwoofer 20c before inter-module integration, while FIG. 5D shows output frequency response plots of the full-range speaker 20b and the subwoofer 20c after the establishment of cooperative inter-device connection. Once the inter-modular connection link is established between the full-range speaker 20b and the subwoofer 20c, the full-range speaker 20b may shift its operational output range from an originally lower region to a higher region. Under this mode of operation, the high frequency output capability of the full-range speaker 20b may be liberated, allowing it to devote its output capability toward a higher frequency range (e.g., at a higher sound pressure level). The duty of lower frequency output generation will be handed to the newly joined subwoofer 20c instead. For example, when the full-range speaker 20b is communicatively coupled with the subwoofer 20c, the processing unit 111 or the control module unit 20d can control the full-range speaker 20b to provide the signal output of the first sound channel signal within a mid-range in the second sound mode shifted from the full frequency range in the first sound mode and control the subwoofer 20c to provide the signal output within a subwoofer range in the second sound mode.

In at least one exemplary embodiment, the processing unit 111 or the control module unit 20d can provide a first sound channel signal to the speaker unit 112 and control the speaker unit 112 to provide a signal output of the first sound channel signal within a first frequency range in the first sound mode. When the first frequency characteristic is determined to be the same as the second frequency characteristic, the processing unit 111 or the control module unit 20d can provide a second sound channel signal to the speaker unit 112, and switch the speaker unit 112 from the first sound mode to the second sound mode to provide the signal output of the second sound channel signal within the first frequency range in the second sound mode. At the same time, the processing unit 111 or the control module unit 20d can provide a third sound channel signal to the sound device 12 and control the sound device 12 to provide the signal output of the third sound channel signal within a first frequency range in the second sound mode. In the exemplary embodiment, the first sound channel signal, the second sound channel signal, and the third sound channel signal are different from each other. For example, the first sound channel signal received by the speaker unit 112 in the first sound mode is a stereo sound signal. If the first frequency characteristic and the second frequency characteristic are a full-range of audible frequency, the processing unit 111 or the control module unit 20d can provide a mono sound channel signal to the speaker unit 112 in the second sound mode. For example, the mono sound channel signal can be one of a right channel signal and a left channel signal. Thus, the processing unit 111 or the control module unit 20d can provide a right channel signal to the speaker unit 112 and provide a left channel signal to the sound device 12 in the second sound mode.

The exemplary embodiments shown and described above are only examples. Even though numerous characteristics and advantages of the present disclosure have been set forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims.

What is claimed is:

1. A speaker device, comprising:
a processing unit;
a speaker unit, the speaker unit coupled to the processing unit and having a first frequency characteristic;
a connection module coupled to the processing unit; and
a storage device, the storage device coupled to the processing unit and storing a plurality of instructions that when executed by the processing unit, cause the processing unit to:
adjust the speaker unit to operate in a first sound mode based on the first frequency characteristic and generate a first sound channel signal to the speaker unit operating in the first sound mode;
detect whether the connection module is communicatively coupled with a sound device having a second frequency characteristic;
determine whether the first frequency characteristic is different from the second frequency characteristic; and
switch the speaker unit from the first sound mode to a second sound mode to generate a second sound channel signal for the speaker unit operating in the second mode when it is determined that the first frequency characteristic is the same as the second frequency characteristic, wherein the first sound channel signal is different from the second sound channel signal.

2. The speaker device of claim 1, the storage device further containing instructions which, when executed by the processing unit, cause the processing unit to:
control the speaker unit to output a first audio output within a first frequency range in the first sound mode; and control the speaker unit to output the first audio output within a second frequency range in the second sound mode when it is determined that the first frequency characteristic is different from the second frequency characteristic, wherein the first frequency range is different from the second frequency range.

3. The speaker device of claim 2, the storage device further containing instructions which, when executed by the processing unit, cause the processing unit to:
control the sound device to output a second audio output within a third frequency range in the second sound mode, wherein the third frequency range is different from the first frequency range and the second frequency range.

4. The speaker device of claim 1, wherein when the first frequency characteristic is a full-range of audible frequency and the second frequency characteristic is a subwoofer characteristic, the first frequency range is the full frequency range, the second frequency range is a mid-range, and the third frequency range is a subwoofer range.

5. The speaker device of claim 1, wherein the first sound channel signal is a stereo sound channel signal, and the second sound channel signal is a mono sound channel signal.

6. The speaker device of claim 1, the storage device further containing instructions which, when executed by the processing unit, cause the processing unit to: generate a third sound channel signal to the sound device when the sound device is operating in the second sound mode when it is determined that the first frequency characteristic is the same as the second frequency characteristic, wherein the third sound channel signal is different from the first sound channel signal and the second sound channel signal.

7. The speaker device of claim 1, the storage device further containing instructions which, when executed by the processing unit, cause the processing unit to:
determine that the first frequency characteristic is different from the second frequency characteristic when a first frequency region having a first frequency response of the speaker unit is different from a second frequency region having a second frequency response of the sound device; and
determine that the first frequency characteristic is the same as the second frequency characteristic when the first frequency region is the same as the second frequency region.

8. A method for controlling a sound mode of a speaker device, the method comprising:
generating, by a processing unit of the speaker device, the sound mode of the speaker device based on a first frequency characteristic of the speaker device and generate a first sound channel signal for the speaker unit operating in the sound mode;
detecting, by the processing unit, whether the speaker device is communicatively coupled with a sound device having a second frequency characteristic;
determining, by the processing unit, whether the first frequency characteristic is different from the second frequency characteristic; and
adjusting, by the processing unit, the sound mode to generate a second sound channel signal for the speaker device and a third sound channel signal for the sound device in the adjusted sound mode when it is determined that the first frequency characteristic is the same as the second frequency characteristic.

9. The method of claim 8, comprising:
controlling the speaker device to output a first audio output within a first frequency range in the sound mode; and
controlling the speaker device to output the first audio output within a second frequency range and controlling the sound device to output a second audio output within a third frequency range in the adjusted sound mode when it is determined that the first frequency characteristic is different from the second frequency characteristic.

10. The method of claim 9, wherein the first frequency range is different from the second frequency range, and the third frequency range is different from the first frequency range and the second frequency range.

11. The method of claim 8, wherein the first sound channel signal is different from the second sound channel signal, and the third sound channel signal is different from the first sound channel signal and the second sound channel signal.

12. The method of claim 8, comprising:
determining that the first frequency characteristic is different from the second frequency characteristic when a first frequency region having a first frequency response of the speaker device is different from a second frequency region having a second frequency response of the sound device; and
determining that the first frequency characteristic is the same as the second frequency characteristic when the first frequency region is the same as the second frequency region.

* * * * *